US009467996B2

(12) United States Patent
Han et al.

(10) Patent No.: US 9,467,996 B2
(45) Date of Patent: *Oct. 11, 2016

(54) METHOD FOR TRANSMITTING AND RECEIVING SIGNALS USING MULTI-BAND RADIO FREQUENCIES (71) Applicant: LG ELECTRONICS INC., Seoul (KR)

(72) Inventors: Seung Hee Han, Anyang-si (KR); Min Seok Noh, Anyang-si (KR); Jin Sam Kwak, Anyang-si (KR); Yeong Hyeon Kwon, Anyang-si (KR); Hyun Woo Lee, Anyang-si (KR); Dong Cheol Kim, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,747

(22) Filed: Dec. 8, 2015

(65) Prior Publication Data

US 2016/0095097 A1 Mar. 31, 2016

Related U.S. Application Data (63) Continuation of application No. 14/600,840, filed on Jan. 20, 2015, now Pat. No. 9,232,519, which is a continuation of application No. 12/849,635, filed on Aug. 3, 2010, now Pat. No. 8,958,409, which is a
(Continued)

(30) Foreign Application Priority Data

Mar. 20, 2008 (KR) ........................ 10-2008-0025817
Aug. 1, 2008 (KR) ........................ 10-2008-0075554
Aug. 28, 2008 (KR) ........................ 10-2008-0084731
Sep. 30, 2008 (KR) ........................ 10-2008-0096055

(51) Int. Cl.
*H04W 72/04* (2009.01)
*H04L 27/26* (2006.01)
(Continued)

(52) U.S. Cl.
CPC ........ *H04W 72/042* (2013.01); *H04L 27/2614* (2013.01); *H04W 72/0413* (2013.01); *H04W 72/0453* (2013.01); *H04J 11/0069* (2013.01); *H04W 88/02* (2013.01); *H04W 88/08* (2013.01)

(58) Field of Classification Search
CPC ......... H04W 72/042; H04W 72/0453; H04W 88/08
USPC ....................................................... 370/343
See application file for complete search history.

(56) References Cited

U.S. PATENT DOCUMENTS 5,778,251 A * 7/1998 Kuroiwa ................. G06F 11/26
326/46
5,909,436 A * 6/1999 Engstrom ............. H04L 5/0053
370/206
(Continued)

FOREIGN PATENT DOCUMENTS

CN 1728580 A 2/2006
CN 1731771 A 2/2006
(Continued)

OTHER PUBLICATIONS

Extended European Search Report for European Application No. 09830462.9 dated Mar. 26, 2013.
(Continued)

Primary Examiner — Chi H Pham
Assistant Examiner — Robert Lopata
(74) Attorney, Agent, or Firm — Birch, Stewart, Kolasch & Birch, LLP (57) ABSTRACT A method for transmitting, by a base station, signals in a communication system. The base station transmits, to a mobile station via a primary carrier band of the mobile station, carrier aggregation configuration information informing the mobile station of a subsidiary carrier band for the mobile station. The base station receives, from the mobile station, control information for the subsidiary carrier band via the primary carrier band. The carrier aggregation configuration information includes a physical identification of a frequency allocation band used as the subsidiary carrier band and a logical identification assigned to the subsidiary carrier band for the mobile station. The physical identification includes one of plural absolute frequency band indexes assigned to frequency allocation bands available in the communication system. The logical identification includes a logical index assigned to the subsidiary carrier band identifying the subsidiary carrier band from among a plurality of frequency allocation bands.

20 Claims, 11 Drawing Sheets

Related U.S. Application Data continuation of application No. 12/343,295, filed on Dec. 23, 2008, now Pat. No. 8,340,014.

(60) Provisional application No. 61/016,799, filed on Dec. 26, 2007.

(51) Int. Cl.
*H04J 11/00* (2006.01)
*H04W 88/02* (2009.01)
*H04W 88/08* (2009.01)

(56) References Cited

U.S. PATENT DOCUMENTS

| | | | | |
|---|---|---|---|---|
| 5,960,354 | A * | 9/1999 | Einola | H04W 36/0055 455/451 |
| 6,366,779 | B1 * | 4/2002 | Bender | H04W 76/02 370/335 |
| 6,546,000 | B1 * | 4/2003 | Schroderus | H04W 72/0453 370/337 |
| 7,486,620 | B2 * | 2/2009 | Seol | H04W 28/22 370/235 |
| 7,672,644 | B2 * | 3/2010 | Sun | H04L 27/261 370/349 |
| 7,715,483 | B2 * | 5/2010 | Cho | H04L 1/0061 370/205 |
| 7,859,985 | B2 * | 12/2010 | Schmidl | H04L 1/1845 370/208 |
| 7,953,048 | B2 * | 5/2011 | Yoon | H04W 52/12 370/329 |
| 7,990,840 | B2 * | 8/2011 | Laroia | H04B 7/022 370/208 |
| 8,036,702 | B2 * | 10/2011 | Etemad | H04L 5/0007 455/168.1 |
| 8,077,652 | B2 * | 12/2011 | Thesling | H04B 7/18582 370/316 |
| 8,180,354 | B2 * | 5/2012 | Li | H04L 5/0016 370/280 |
| 8,204,025 | B2 * | 6/2012 | Cai | H04L 5/0044 370/337 |
| 8,259,828 | B2 * | 9/2012 | Fu | H04L 25/03159 370/208 |
| 8,270,390 | B2 * | 9/2012 | Kosaka | H04W 56/002 370/324 |
| 8,340,014 | B2 * | 12/2012 | Han | H04L 27/2614 370/319 |
| 8,391,400 | B2 * | 3/2013 | Zhang | H04L 5/0007 341/173 |
| 8,553,604 | B2 * | 10/2013 | Kazmi | H04L 12/189 370/312 |
| 8,560,009 | B2 * | 10/2013 | Etemad | H04L 5/0007 455/509 |
| 2001/0040880 | A1 * | 11/2001 | Chen | H04W 52/265 370/337 |
| 2004/0052273 | A1 * | 3/2004 | Karaoguz | G01S 5/0252 370/465 |
| 2005/0054391 | A1 | 3/2005 | Chen | |
| 2006/0003702 | A1 * | 1/2006 | Nibe | H04L 1/0003 455/67.11 |
| 2006/0013182 | A1 | 1/2006 | Balasubramanian et al. | |
| 2006/0025136 | A1 | 2/2006 | Fujita et al. | |
| 2006/0056354 | A1 * | 3/2006 | Vasudevan | H04W 72/042 370/332 |
| 2006/0073846 | A1 | 4/2006 | Drury et al. | |
| 2006/0223461 | A1 * | 10/2006 | Laroia | H04B 7/022 455/103 |
| 2006/0233150 | A1 * | 10/2006 | Cherian | H04W 48/08 370/342 |
| 2006/0291403 | A1 | 12/2006 | Kahtava et al. | |
| 2007/0153929 | A1 * | 7/2007 | Ballentin | H04L 5/0053 375/260 |
| 2007/0167160 | A1 * | 7/2007 | Asanuma | H04W 72/14 455/434 |
| 2007/0173269 | A1 | 7/2007 | Laroia et al. | |
| 2008/0200203 | A1 * | 8/2008 | Malladi | H04W 52/287 455/522 |
| 2009/0080380 | A1 * | 3/2009 | Chun | H04W 28/06 370/329 |
| 2009/0141678 | A1 * | 6/2009 | Sun | H04L 1/1819 370/329 |
| 2009/0161611 | A1 * | 6/2009 | Kuroda | H04B 7/2656 370/239 |
| 2009/0185632 | A1 * | 7/2009 | Cai | H04L 5/0044 375/260 |
| 2009/0219873 | A1 | 9/2009 | Higuchi et al. | |
| 2009/0325585 | A1 * | 12/2009 | Farajidana | H04W 72/14 455/450 |
| 2010/0118825 | A1 * | 5/2010 | Kawamura | H04L 5/0007 370/330 |
| 2010/0260137 | A1 * | 10/2010 | Vrzic | H04L 5/0007 370/330 |
| 2010/0285811 | A1 * | 11/2010 | Toda | H04W 48/10 455/452.1 |
| 2011/0064029 | A1 * | 3/2011 | Schmidl | H04L 1/1845 370/328 |
| 2011/0096783 | A1 * | 4/2011 | Cai | H04L 5/0044 370/395.4 |
| 2011/0103406 | A1 * | 5/2011 | Cai | H04L 5/0044 370/480 |
| 2012/0127909 | A1 * | 5/2012 | Lee | H04W 72/005 370/312 |

FOREIGN PATENT DOCUMENTS

| | | |
|---|---|---|
| EP | 1 128 573 A2 | 8/2001 |
| EP | 1 492 275 A2 | 12/2004 |
| EP | 1605726 A1 | 6/2005 |
| EP | 1 850 547 A2 | 10/2007 |
| EP | 1982816 A1 | 10/2008 |
| JP | 2002-204204 A | 7/2002 |
| JP | 2003-264524 A | 9/2003 |
| RU | 2 149 518 C1 | 5/2000 |
| WO | WO 2006/104344 A2 | 10/2006 |
| WO | WO 2006/126079 A2 | 11/2006 |
| WO | WO 2007/052917 A1 | 5/2007 |
| WO | WO 2007/129540 A1 | 11/2007 |

OTHER PUBLICATIONS

U.S. Appl. No. 14/600,840, filed Jan. 20, 2015; U.S. Appl. No. 12/849,635, filed Aug. 3, 2010; and U.S. Appl. No. 12/343,295, filed Dec. 23, 2008.

\* cited by examiner

METHOD FOR TRANSMITTING AND RECEIVING SIGNALS USING MULTI-BAND RADIO FREQUENCIES

CROSS-REFERENCE TO RELATED APPLICATIONS

This Application is a Continuation of U.S. patent application Ser. No. 14/600,840 filed on Jan. 20, 2015, which is a Continuation of U.S. patent application Ser. No. 12/849,635 filed on Aug. 3, 2010 (now U.S. Pat. No. 8,958,409 issued on Feb. 17, 2015), which is a Continuation of U.S. patent application Ser. No. 12/343,295 filed on Dec. 23, 2008 (now U.S. Pat. No. 8,340,014 issued on Dec. 25, 2012), which claims the benefit under 35 U.S.C. §119(e) to U.S. Provisional Application No. 61/016,799 filed on Dec. 26, 2007, and under 35 U.S.C. §119(a) to Korean Patent Application Nos. 10-2008-0096055 filed on Sep. 30, 2008, 10-2008-0084731 filed on Aug. 28, 2008, 10-2008-0075554 filed on Aug. 1, 2008, and 10-2008-0025817 filed on Mar. 20, 2008, all of which are hereby expressly incorporated by reference into the present application.

BACKGROUND OF THE INVENTION

1. Field of the Invention

The present invention relates to a method for transmitting and receiving signals, wherein multi-band IDs are specified in order to efficiently manage multi-band Radio Frequencies (RFs) in a communication system that supports multi-band RFs and ID-related information is signaled to transmit and receive signals.

2. Discussion of the Related Art

The following description is given mainly focusing on a downlink (DL) mode in which a base station transmits signals to one or more terminals. However, it will be easily understood that the principle of the present invention described below can be directly applied to an uplink (UL) mode simply by reversing the procedure of the DL mode.

A technology in which one entity corresponding to a specific layer above the physical layer manages multiple carriers or frequency allocation bands (or simply frequency allocations (FAs)) has been suggested to efficiently use multiple bands or multiple carriers.

Figure 1:
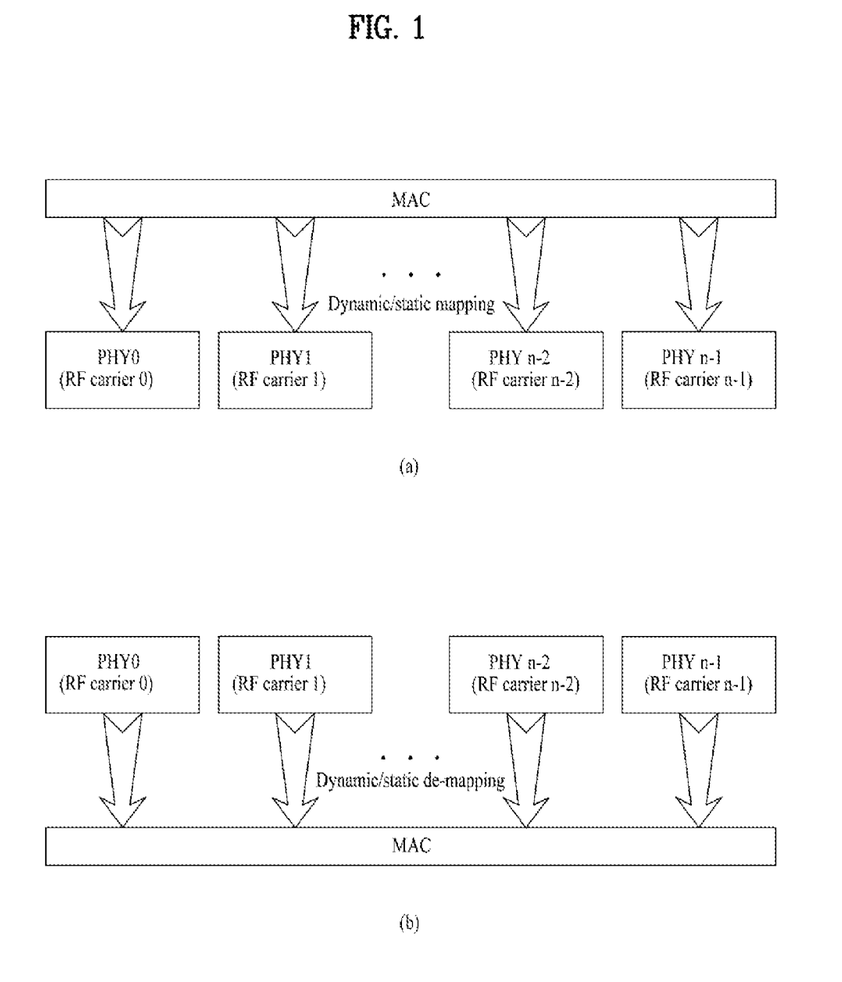
FIG. 1, including (a) and (b), schematically illustrates a method for transmitting and receiving signals using multi-band RFs.

FIG. 1 schematically illustrates a method for transmitting and receiving signals using multi-band RFs.

In FIGS. 1(a) and 1(b), PHYO, PHY1, . . . PHY n-2, and PHY n-1 represent multiple bands according to this technology and each of the bands may have a Frequency Allocation (FA) band size allocated for a specific service according to a predetermined frequency policy. For example, the band PHY0 (RF carrier 0) may have a band size allocated for a general FM radio broadcast and the band PHY1 (RF carrier 1) may have a band size allocated for mobile phone communication. Although each frequency band may have a different band size depending on the characteristics of the frequency band, it is assumed in the following description that each Frequency Allocation band (FA) has a size of A MHz for ease of explanation. Each FA can be represented by a carrier frequency that enables a baseband signal to be used in each frequency band. Thus, in the following description, each frequency allocation band will be referred to as a "carrier frequency band" or will simply be referred to as a "carrier" as it may represent the carrier frequency band unless such use causes confusion. As in the recent 3GPP LTE-A, the carrier is also referred to as a "component carrier" for discriminating it from a subcarrier used in the multicarrier system.

From this aspect, the "multi-band" scheme can also be referred to as a "multicarrier" scheme or "carrier aggregation" scheme.

In order to transmit signals through multiple bands as shown in FIG. 1(a) and to receive signals through multiple bands as shown in FIG. 1(b), both the transmitter and the receiver need to include an RF module for transmitting and receiving signals through multiple bands. In FIG. 1, the method of configuring a "MAC" is determined by the base station, regardless of the DL or UL mode.

Simply stated, the multi-band scheme is a technology in which a specific layer entity (for example, one MAC entity), which will simply be referred to as a "MAC" unless such use causes confusion, manages and operates a plurality of RF carriers to transmit and receive signals. RF carriers managed by one MAC do not need to be contiguous. Accordingly, this technology has an advantage of high flexibility in management of resources.

For example, frequencies may be used in the following manner.

Figure 2:
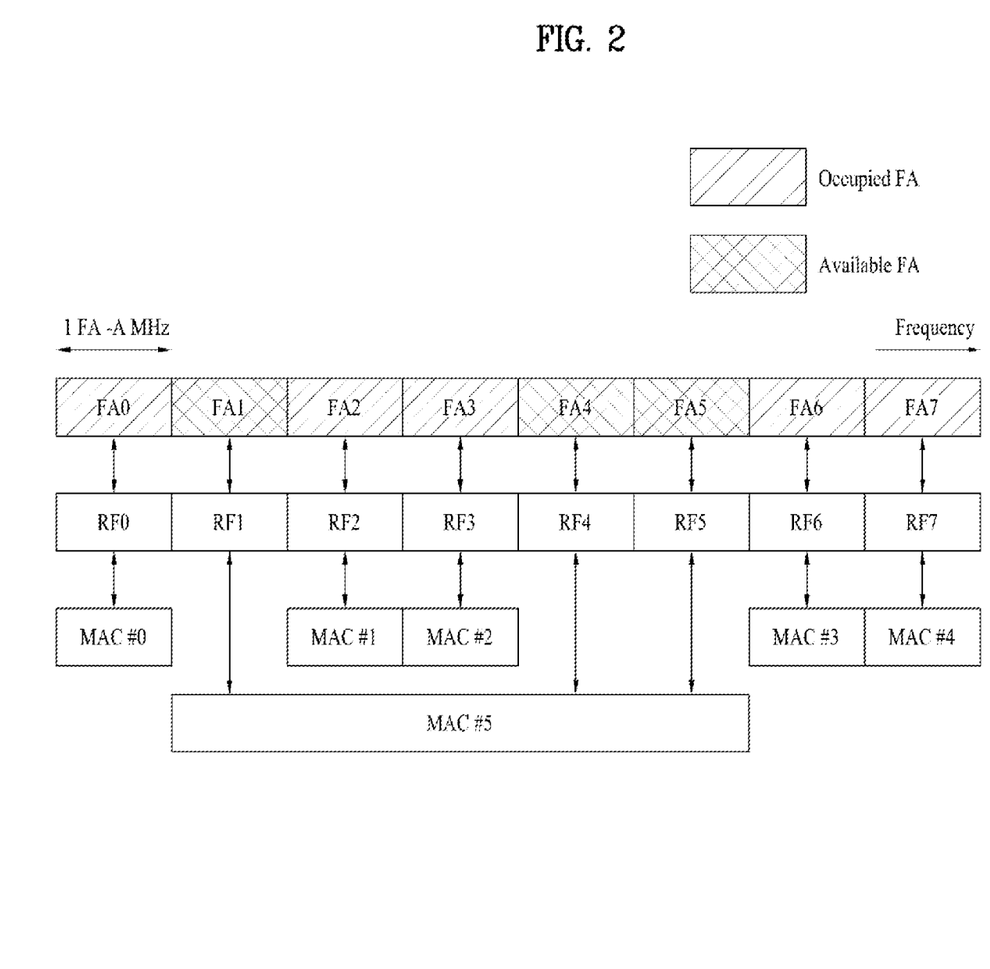
FIG. 2 illustrates an example wherein frequencies are allocated in a multi-band-based communication scheme.

FIG. 2 illustrates an example wherein frequencies are allocated in a multi-band-based communication scheme.

In FIG. 2, bands FA0 to FA7 can be managed based on RF carriers RF0 to RF7. In the example of FIG. 2, it is assumed that the bands FA0, FA2, FA3, FA6, and FA7 have already been allocated to specific existing communication services. It is also assumed that RF1 (FA1), RF4 (FA4), and RFS (FA5) can be efficiently managed by one MAC (MAC #5). Here, since the RF carriers managed by the MAC need not be contiguous as described above, it is possible to more efficiently manage frequency resources.

In the case of downlink, the concept of the multi-band-based scheme described above can be exemplified by the following base station/terminal scenario.

Figure 3:
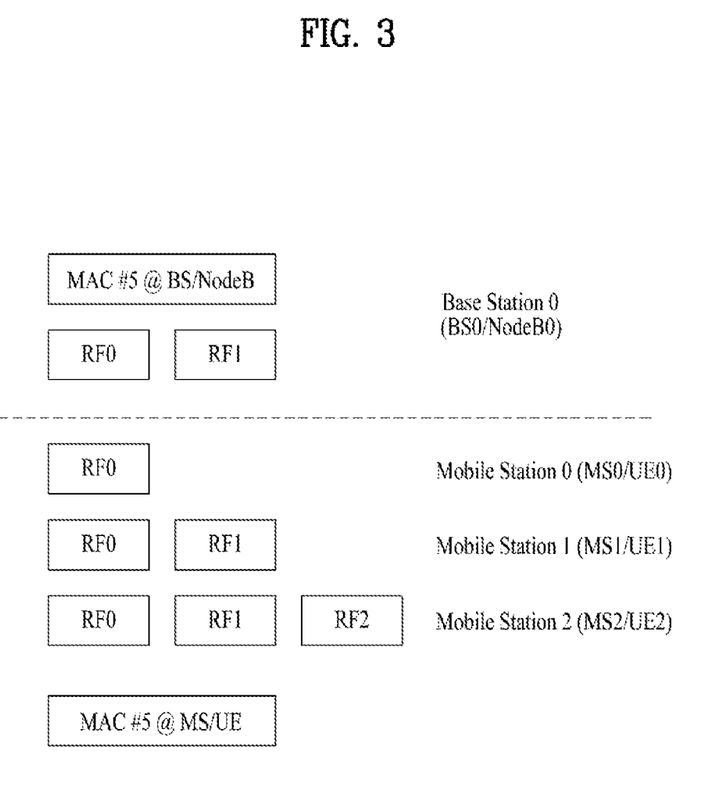
FIG. 3 illustrates an example scenario in which one base station communicates with a plurality of terminals (UEs or MSs) in a multi-band-based scheme.

FIG. 3 illustrates an example scenario in which one base station communicates with a plurality of terminals (UEs or MSs) in a multi-band-based scheme.

In FIG. 3, it is assumed that terminals 0, 1, and 2 have been multiplexed. The base station 0 transmits signals through frequency bands managed by carriers RF0 and RF1. It is also assumed that the terminal 0 is capable of receiving only the carrier RF0, the terminal 1 is capable of receiving both the carriers RF0 and RF1, and the terminal 0 is capable of receiving all the carriers RF0, RF 1, and RF2.

Here, the terminal 2 receives signals of only the carriers RF0 and RF1 since the base station transmits only the carriers RF0 and RF1.

However, the above multi-band-based communication scheme has only been conceptually defined and an ID specification method, which enables more efficient management of each frequency allocation band, and a method for signaling ID-related information have not been defined in detail.

SUMMARY OF THE INVENTION

An object of the present invention devised to solve the problem lies on providing a method for transmitting and receiving signals, wherein ID information of multiple frequency bands is specified in a multi-band-based communication system and a method for efficiently signaling ID-related information to achieve improved signal transmission and reception.

Another object of the present invention devised to solve the problem lies on providing a method for transmitting ID information of multiple frequency bands while overcoming the Peak-to-Average Ratio (PAPA) problem.

In accordance with an embodiment of the present invention, the above and other objects can be achieved by providing a method for transmitting signals, the method including transmitting an information unit of a specific layer above a physical layer through a plurality of frequency allocation bands managed by an entity corresponding to the specific layer, and transmitting control information identifying each of the plurality of frequency allocation bands, wherein each of the plurality of frequency allocation bands managed by the entity has a band size for allocation for a specific service according to a predetermined frequency policy and the control information identifying each of the plurality of frequency allocation bands includes a second ID into which a first ID has been converted, the first ID identifying each of the plurality of frequency allocation bands in the physical layer, the second ID identifying each of the plurality of frequency allocation bands managed by the entity in the physical layer.

Here, the control information may include the first ID and the second ID for each of the plurality of frequency allocation bands managed by the entity and may be transmitted through at least one of a preamble or a control signal.

When the control information is transmitted through the preamble, the control information may be identified through a different preamble code or a different preamble timing offset. Here, the preamble timing offset may be applied as a timing offset of the entirety of a frame including the preamble.

In addition, the control information of each of the plurality of frequency allocation bands managed by the entity may be individually specified for each of the plurality of frequency allocation bands. Alternatively, the plurality of frequency allocation bands managed by the entity may be divided into at least one primary carrier frequency band and at least one subsidiary carrier frequency band, and the at least one primary carrier frequency band may be set to include control information of a predetermined number of subsidiary carrier frequency bands.

Here, the at least one primary carrier frequency band may include a plurality of primary carrier frequency bands. In this case, each of the plurality of primary carrier frequency bands may be used to transmit information of a predetermined number of subsidiary carrier frequency bands.

In accordance with another embodiment of the present invention, the above and other objects can be achieved by providing a method for receiving signals, the method including receiving an information unit of a specific layer above a physical layer through a plurality of frequency allocation bands managed by an entity corresponding to the specific layer, and receiving control information identifying each of the plurality of frequency allocation bands, wherein each of the plurality of frequency allocation bands managed by the entity has a band size for allocation for a specific service according to a predetermined frequency policy and the control information identifying each of the plurality of frequency allocation bands includes information of a second ID into which a first ID has been converted, the first ID identifying each of the plurality of frequency allocation bands in the physical layer, the second ID identifying each of the plurality of frequency allocation bands managed by the entity in the physical layer.

According to each of the embodiments of the present invention described above, it is possible to more efficiently manage a plurality of carrier frequency bands managed by one entity and the receiving side can more easily set a procedure for receiving signals through a plurality of carriers.

In addition, according to the embodiment wherein a timing offset is applied to the entirety of a frame or to a preamble (synchronous channel) transmitted in the frame, it is possible to distribute the time of signal transmission, thereby reducing the PAPA.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

The present invention suggests an ID specification method, which allows one MAC to efficiently manage a plurality of RF carriers, and a method for signaling ID-related information. In the following description, the term "Media Access Control (MAC) layer" is used as a general term describing a layer (for example, a network layer) above the Physical (PHY) layer (Layer 1) among the 7 OSI layers, which is not necessarily limited to the MAC layer. Although the following description has been given with reference to an example where multi-band RFs are contiguous, the multiple bands according to the present invention do not necessarily include physically contiguous RF carriers as described above with reference to FIG. 2. In addition, although the bandwidth of each RF carrier is described below as being equal for ease of explanation, the present invention may also be applied to the case where the bandwidths of frequency bands managed based on each RF carrier are different. For example, an RF frequency band (RF0) of 5 MHz and an RF frequency band (RF1) of 10 MHz may be managed by one MAC entity.

In addition, although RF carriers in the present invention may be those of the same system, the RF carriers may also be those to which different Radio Access Technologies (RATs) are applied. For example, we can consider an example wherein the 3GPP LTE technology is applied to RF0 and RF1, the IEEE 802.16m technology is applied to RF2, and the GSM technology is applied to RF3.

An embodiment of the present invention suggests that the position of each frequency band in an actual physical layer managed by one MAC be managed by conversion into a logical index. In addition, it is assumed that the maximum number of RF carriers managed by one MAC in one system is limited to M.

The following is a detailed description with reference to the example of FIG. 2 wherein the MAC #5 manages RF carriers.

In the example of FIG. 2, it is assumed that the maximum number of RF carriers managed by one MAC is 3. It is also assumed that the 3 RF carriers are named RF1, RF4, and RF5 which are absolute frequency band index values. In this case, the physical frequency indices RF1, RF4, and RF5 can be managed by conversion into logical indices 0, 1, and 2 according to this embodiment.

Accordingly, there is a need to provide a method for signaling carrier-ID-related information to the receiving side according to this embodiment. Signaling of the maximum number of carriers managed by one MAC may be needed in some cases.

When the maximum number of carriers managed by one MAC is M, this embodiment suggests two ID signaling methods: 1) a method in which ID information is transmitted through a preamble and 2) a method in which ID information is transmitted through a common control signal, a broadcast channel, or the like. Possible methods for signaling ID information using a preamble include a method in which a different signature is included in a preamble to be transmitted and a method in which an offset is applied to the timing of transmission of a preamble. Applying an offset to the preamble transmission timing may be construed as applying the offset not only to the timing of transmission of the preamble but also to the timing of transmission of the entirety of a frame including the preamble.

Although it is assumed in the above example that one carrier includes one carrier ID, it is also possible to define one logical carrier ID into which one or more physical carrier IDs are grouped. Here, the preamble is a signal that is transmitted through a synchronous channel. Accordingly, the preamble will be used as a concept identical to or including the synchronous channel.

First, reference will be made to a method for selectively signaling information regarding the number of carriers managed by one MAC together with each carrier ID as described above through a preamble.

As an example of the carrier ID signaling method described above, an embodiment of the present invention suggests a method in which a different signature is allocated to each carrier ID. As a specific method for providing a different signature for each carrier ID, this embodiment suggests a method in which a different code is allocated to each carrier ID and a method in which each carrier ID is indicated by a preamble transmission timing offset or a frame transmission timing offset.

Although this embodiment has been described such that one preamble is transmitted per carrier for ease of explanation, a plurality of preambles may also be transmitted per carrier.

It is possible to apply the same concept as described above if synchronous channel configurations such as a P-SCH and an S-SCH which will be used in the 3GPP LTE evolution are grouped and the group is regarded as a preamble in this embodiment.

Reference will now be made to a method for allocating a different code to each carrier ID as a more specific embodiment of the present invention.

First, this embodiment suggests a method for indicating a different carrier ID through a different code. Generally, a preamble is used to detect a cell ID. For example, when there is a need to identify a total of 114 cell IDs, it is required that they be identified using at least 114 different codes and, when there is a need to identify 4 additional carrier IDs according to this embodiment, it is required that a total of 456 (=114*4) different codes be allocated. Here, the term "different codes" refers to codes that can be discriminated from each other and may be a set of codes which are correlated with each other at a predetermined correlation level or less, a set of circular shift sequences, a set of sequences covered by orthogonal sequences, or the like and need not be limited to any specific code types.

In addition, another embodiment of the present invention using the above concept suggests that carriers representing respective frequency allocation bands be discriminated and used according to the usages of the carriers.

Specifically, this embodiment suggests that at least one of a plurality of carriers be defined as a primary carrier. This primary carrier is a carrier, for which the terminal initially attempts to search when initial cell search or initial neighbor cell search is performed. Generally, the primary carrier can be used to transmit a system configuration indicating a multi-carrier configuration or a system bandwidth, a common control signal, or broadcast information. In this case, the terminal only needs to determine whether the corresponding carrier is a primary carrier or a different carrier which is referred to as a "subsidiary carrier" in the following description.

In this case, it is preferable that two codes be additionally allocated in order to identify the usage of each carrier. Here, it is to be noted that the purpose of the two additionally allocated codes is not to identify carrier IDs in the above example. In this example, when the number of carrier IDs is 114, the total number of needed codes is 228 (=114*2).

Reference will now be made to a method for identifying a carrier ID using a preamble timing offset as another embodiment of the present invention.

Figure 4:
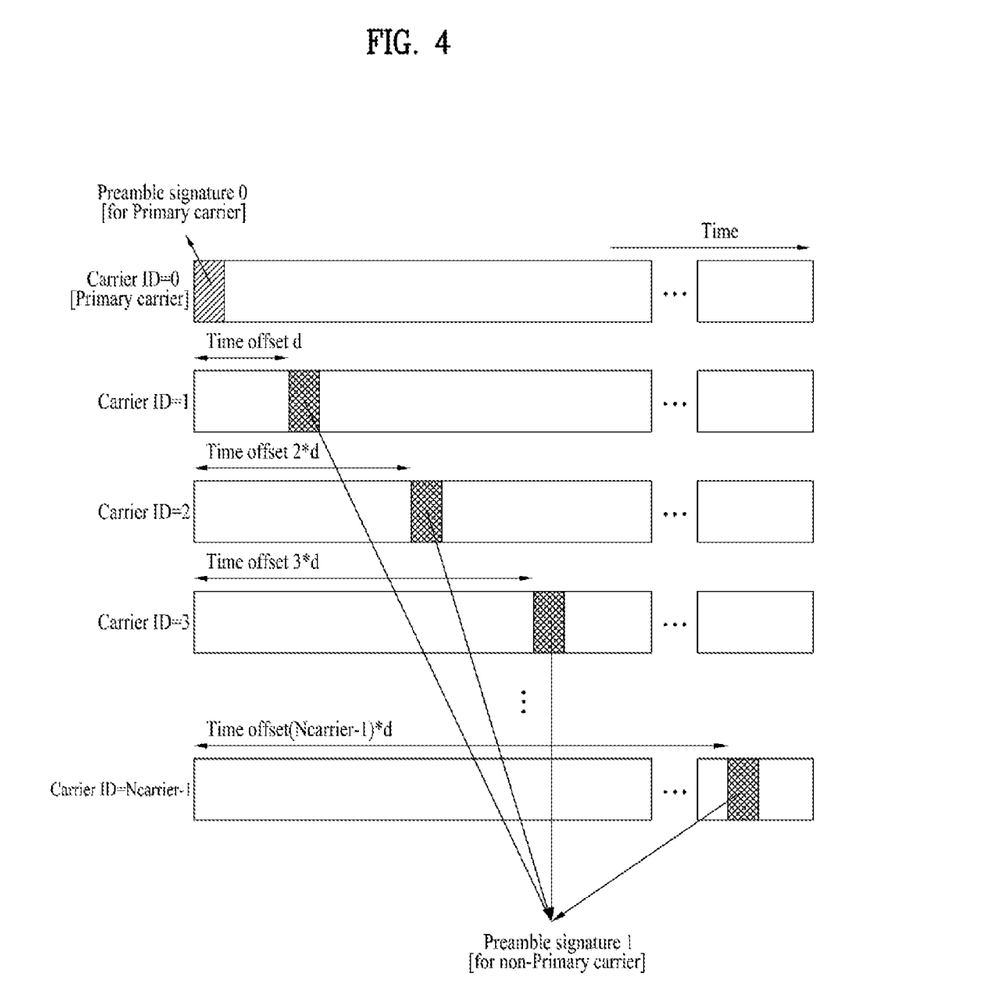
FIG. 4 illustrates an example method for identifying a carrier ID using a preamble timing offset according to this embodiment.

FIG. 4 illustrates an example method for identifying a carrier ID using a preamble timing offset according to this embodiment.

In this example, a primary carrier and a subsidiary carrier are discriminated (i.e., identified) using two types of preamble signatures. More specifically, a signature 0 is used for the primary carrier and a signature 1 is used for the subsidiary carrier in the example of FIG. 4.

In this example, a timing offset value of one carrier unit is set to "d" as shown in FIG. 4. The "d" value may be set to various values as described below.

First, in an embodiment of the present invention, the "d" value can be set to be less than a preamble transmission period or a synchronous channel transmission period. For example, in the case of the 3GPP LTE system, P-SCH and S-SCH signals included in a synchronous channel are transmitted every 5 ms which is the length of a subframe (where the P-SCH signal will hereinafter be referred to as a "Primary Synchronization Signal (PSS)" and the S-SCH signal will hereinafter be referred to as a "Secondary Synchronization Signal (SSS)") and two pairs of PSSs and SSSs are transmitted in a 10 ms frame including two subframes.

Two SSSs transmitted in 10 ms have different signatures (for example, two short swapped sequences) so that the receiving side can determine whether a corresponding subframe in a 10 ms frame is a subframe 0 or a subframe 1. Under this assumption, the "d" value can be set to 5 ms.

In another embodiment of the present invention, the "d" value can be set to be equal to or greater than the preamble transmission period or the synchronous channel transmission period. For example, in the case of the 3GPP LTE system, it may be difficult to derive, from only the synchronous channel, the "d" value set to be equal to or greater than the synchronous channel transmission period since the same SSS is repeated every 10 ms in the 3GPP LTE system. In this case, this embodiment suggests that the "d" value be derived through a System Frame Number (SFN).

In the 3GPP LTE system, the SFN is transmitted through a P-BCH included in a subframe 0 (0-4905). When it is assumed that the "d" value has been set to 10 ms, the SFN of the carrier 0 is 10 and the SFN of the carrier 1 is 11 and therefore it is possible to derive the "d" value. The SFN is incremented by one every 10 ms.

A different "d" value may be set for each RF carrier. Here, the "d" value may have a circular shift form on an OFDM symbol basis or may be a delay value on a smaller unit basis.

When the delay value is controlled in a circular shift form, this can be directly applied to the time domain or can be applied to the frequency domain. A circular shift may be set to be equally applied to every signal (for example, a Reference Signal (RS) and data) transmitted through each carrier band or a circular shift may be set to be applied to only the reference signal or the preamble. That is, while transmission data is left unchanged, only the reference signal or the preamble can be transmitted so as to have an offset according to the "d" value. In another method, while transmission data is left unchanged, only the SFN transmitted in the P-BCH can be incremented. This can replace the above method in which the preamble/synchronous channel or reference signal is transmitted with an offset applied thereto according to the "d" value. A method in which transmission data elements are also transmitted with an offset applied thereto and the SFN is set to be incremented accordingly may also be applied.

For reference, the SFN in the 3GPP LTE system consists of 12 bits. The more significant 10 bits among 12 bits are explicitly transmitted through a P-BCH corresponding to 40 ms and may have a value of 0-1023 during 40 ms. The less significant 2 bits among the 12 SFN bits can be derived through blind decoding based on a unique start position (RV) of a circular buffer.

When a timing offset is applied to a signal transmitted through each carrier band as in the above embodiment, it is possible to achieve an advantage of reduction in the PAPA of the transmission signal. Here, let us assume that four carriers are transmitted using one RF module in the 3GPP LTE system. In this case, a problem may occur in the PAPA since four carriers are all transmitted based on the same physical cell ID. However, it is possible to achieve an advantage of reduction in the PAPR by setting a different transmission timing for each carrier band as described above. Accordingly, according to the above embodiment, the method in which a different timing offset is applied to each carrier can also be used to reduce the PAPA. Here, to apply a different timing offset to each carrier, the circular shift may be applied both in the time domain and in the frequency domain as described above.

In addition, in another embodiment of the present invention, it is possible to set the "d" value in various manners so that the receiving side can determine the "d" value through combination of the preamble/synchronous channel and the SFN described above.

For example, although the "d" value is set on the basis of a P-BCH (10 ms) to apply an offset in the above description, it is also possible to set the "d" value on the basis of four P-BCHs (i.e., on a 40 ms basis) to apply an offset.

The embodiment as shown in FIG. 4 has an advantage in that a corresponding carrier ID can be efficiently detected through a small amount of calculation. The embodiment as shown in FIG. 4 also has an advantage in that there is no need to perform additional control signaling for carrying the carrier ID. For example, the terminal (Mobile Station (MS) or User Equipment (UE)) may perform initial processes for signal processing in the following order.

1. The terminal searches for a primary carrier through a preamble signature "0" (i.e., carrier ID=0) and achieves time synchronization.
2. The terminal achieves time synchronization through a preamble of a signature "1" for a specific carrier.
3. The terminal detects a current carrier ID using a time offset from the primary carrier.

Figure 5:
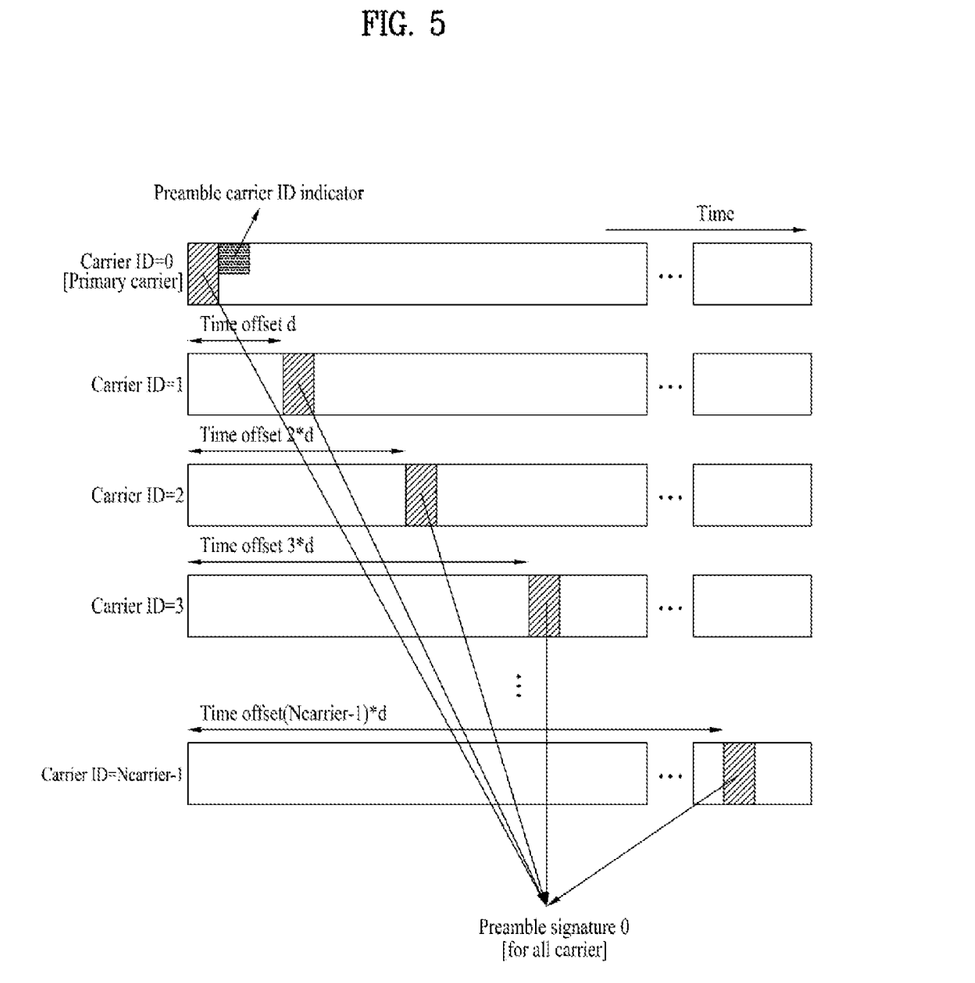
FIG. 5 illustrates another embodiment of the method for identifying a carrier ID using a preamble timing offset.

FIG. 5 illustrates another embodiment of the method for identifying a carrier ID using a preamble timing offset.

In the example of FIG. 5, all carriers use the same preamble signature (code) and the carrier ID is represented by a timing offset. Here, it is preferable that an indicator representing the carrier ID be transmitted at a position adjacent to the preamble of the primary carrier in order to provide a reference for timing offset comparison. In FIG. 5, this indicator is shown by "Primary carrier ID indicator".

According to this embodiment, for example, the terminal may perform initial processes for signal processing in the following order.

1. The terminal searches for a primary carrier through a preamble signature "0" and a primary carrier indicator (i.e., carrier ID=0) and achieves time synchronization.
2. The terminal achieves time synchronization through a preamble of a signature "0" for a specific carrier.
3. The terminal detects a current carrier ID using a time offset from the primary carrier.

The following is a description of another example of transmission of carrier ID information for each carrier, similar to the embodiment of FIG. 5.

Figure 6:
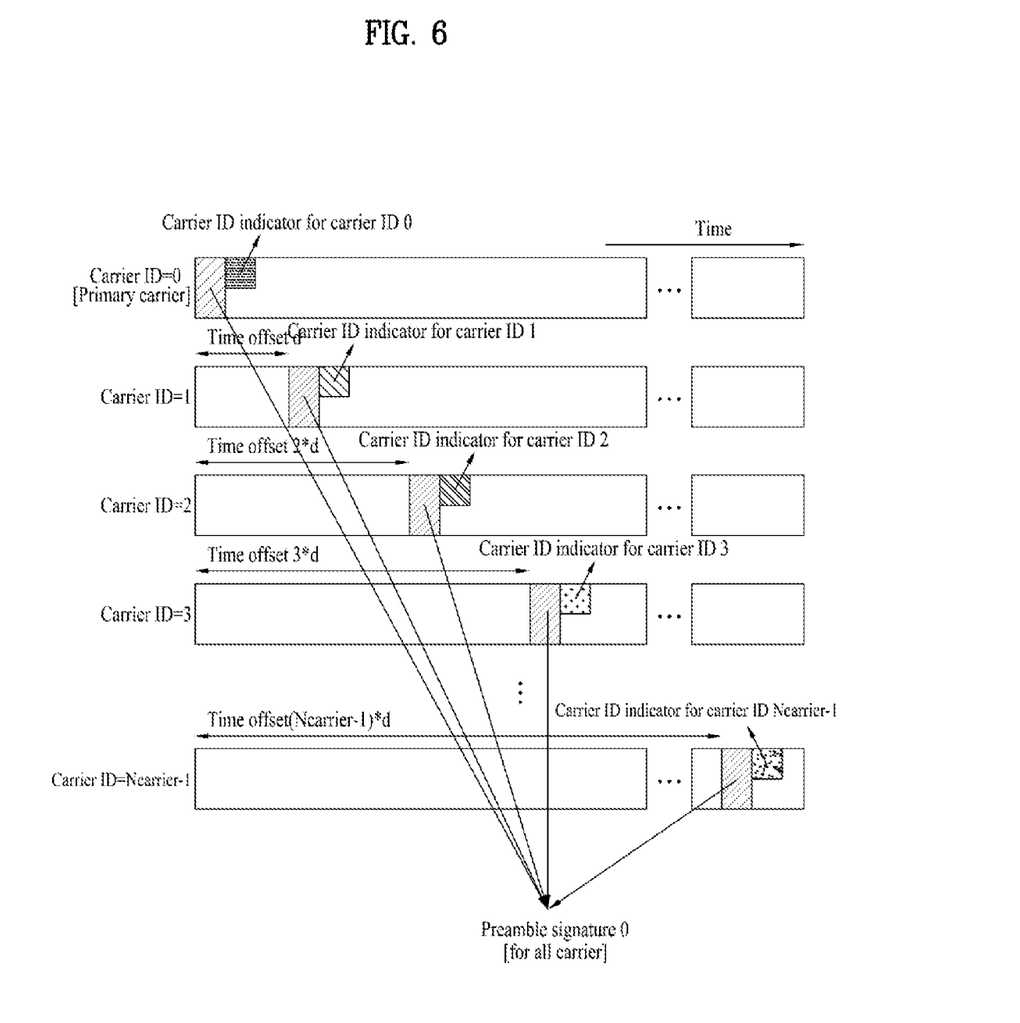
FIG. 6 illustrates another embodiment of the method for identifying a carrier ID using a preamble timing offset.

FIG. 6 illustrates another embodiment of the method for identifying a carrier ID using a preamble timing offset.

In the method of the embodiment shown in FIG. 6, a control signal indicating the carrier ID is transmitted in each carrier. In this case, once a carrier ID is detected, the terminal can detect all remaining carrier IDs at the preamble detection step without decoding corresponding control signal information.

Figure 7:
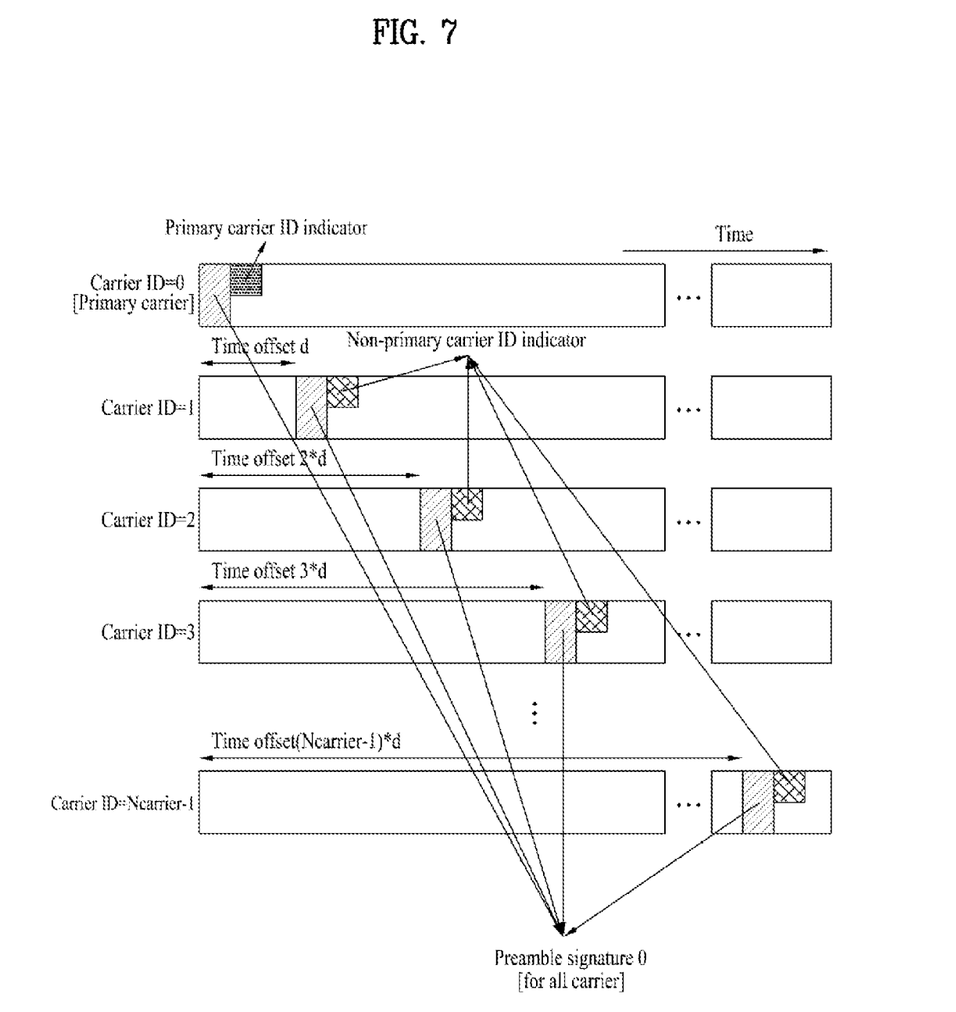
FIGS. 7 and 8 illustrate another embodiment of the method for identifying a carrier ID using a preamble timing offset.
Figure 8:
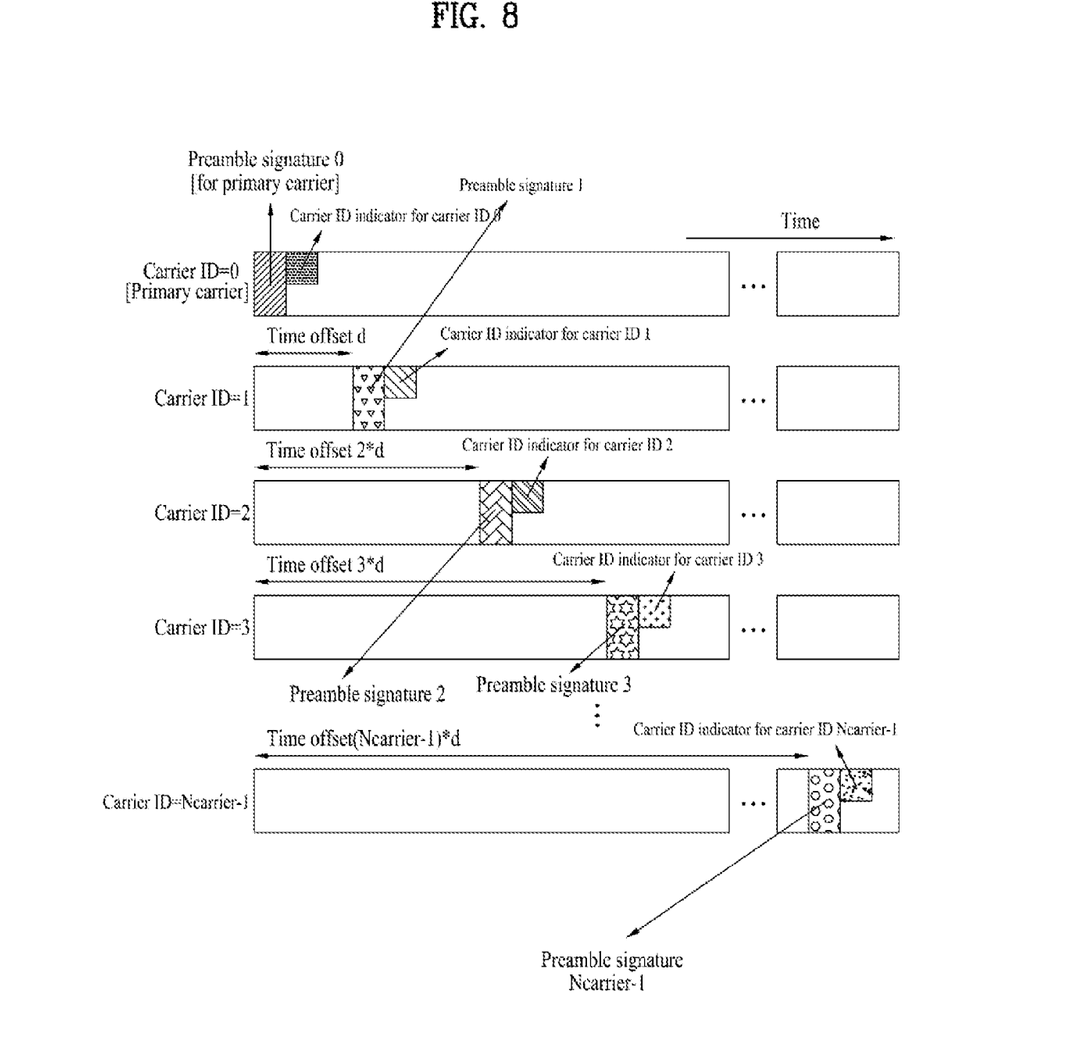

FIGS. 7 and 8 illustrate another embodiment of the method for identifying a carrier ID using a preamble timing offset.

Specifically, although the method of FIG. 7 is similar to that of FIG. 6, an ID indicator for the primary carrier and an ID indicator for the subsidiary carrier are separately transmitted in the method of FIG. 7. Although the method of FIG. 8 is similar to that of FIG. 6, a different preamble code is used for each carrier ID and different carrier indication information is also defined for each carrier ID in the method of FIG. 8.

While the main feature of the above embodiments of the present invention is that information regarding a carrier ID is transmitted using a timing offset, carrier information may be transmitted using various other methods. Applying an offset to the preamble transmission timing in the embodiments described above with reference to FIGS. 4 to 8 can be considered identical to applying a time offset to the entirety of a frame including the corresponding preamble to transmit information regarding the carrier ID.

An embodiment wherein carrier-related information according to the present invention is transmitted through a common control channel (broadcast channel) can also be provided. A carrier ID defined according to the present invention can be transmitted through a broadcast channel or a control signal for each carrier. For example, in the case of the IEEE 802.16m supporting the legacy mode, a carrier ID can be signaled using a reserved bit among 5 DLFP bits of a broadcast channel used in the conventional IEEE 802.16 e and can also be signaled through a DL-MAP. Alternatively, a new DLFP/DL-MAP format may be defined to transmit the carrier ID. In the case of 3GPP LTE, a carrier ID can be transmitted through a broadcast channel (BCH).

More specifically, in the case of 3GPP LTE, information indicating whether the corresponding carrier is a primary carrier or a subsidiary carrier can be transmitted using 1-bit signaling through a Physical Broadcast Channel (P-BCH). That is, the primary carrier may be signaled through a bit value "0" and the subsidiary carrier may be signaled through a bit value "1" in the P-BCH. Alternatively, the primary carrier may be signaled through a bit value "1" and the subsidiary carrier may be signaled through a bit value "0" in the P-BCH. Here, the primary carrier is a carrier that the terminal initially attempts to access as described above.

Reference will now be made to a method for transmitting a control signal (a carrier-related control signal such as a carrier ID) through a primary carrier as another embodiment of the present invention.

This embodiment suggests that all carrier IDs or control signals managed by a MAC be transmitted using a primary carrier defined according to an embodiment of the present invention. When all carrier-ID-related information is transmitted using the primary carrier, carrier indices that can be managed by one MAC, logical indices of available frequency bands, or physical indices occupied by the subsidiary carrier can be set to be transmitted using the primary carrier. In the description of the present invention, the MAC is only an example of a specific layer which is located above the physical layer and which can manage a plurality of carriers as described above. The "MAC" includes not only the concept defined in IEEE but also the concept of a MAC present for each carrier band in the 3GPP system.

The following is a description of the example illustrated in FIG. 2. Here, let us assume that the bands FA1, FA4, and FA5 are frequency allocation bands available in the multi-carrier-based system while the band FA1 is a primary carrier frequency band. In this case, multi-carrier-related control information can be transmitted through the primary carrier frequency band FA1 according to this embodiment. Since the bands FA0 to FA7 can be used in the system in this embodiment, carrier indices 1, 4, and 5 covered by the corresponding MAC can be transmitted as a control signal of the primary carrier. In an alternative method, when the indices 1, 4, and 5 of the physical channels FA1, FA4, and FA5 are converted to logical indices, it is possible to signal a logical index 0 located at the physical channel FA1, a logical index 1 located at the physical channel FA4, and a logical index 2 located at the physical channel FA5 in the primary carrier. It is also possible to transmit all the control signals described above.

Figure 9:
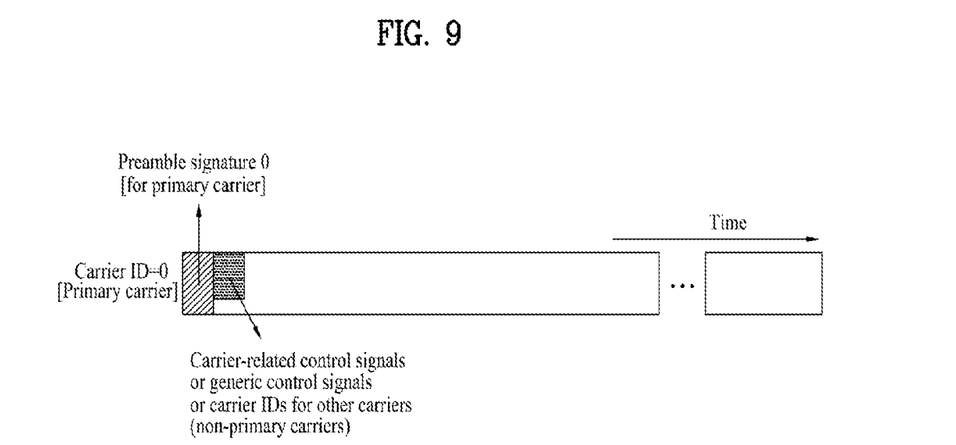
FIG. 9 illustrates the concept that all carrier-related control information is transmitted using a primary carrier according to an embodiment of the present invention.

FIG. 9 illustrates the concept that all carrier-related control information is transmitted using a primary carrier according to an embodiment of the present invention.

Here, the control signals transmitted in the primary carrier include all types of control signals described above such as a carrier-related control signal, a general control signal, and a carrier ID as conceptually illustrated in FIG. 9.

In the above embodiments, the preamble of each carrier in the case where a control signal is transmitted using the primary carrier may or may not be identical. The method in which all carrier-related information is transmitted using the primary carrier according to the embodiments can be used in combination with the embodiment wherein carrier information is transmitted using the preamble.

In the above description, carriers managed by one MAC include only one primary carrier. However, carriers managed by one MAC may include a plurality of primary carriers and the following description will be given focusing on the case where two or more primary carriers are included in carriers managed by one MAC.

A method in which carrier-related information is separately defined and transmitted using a preamble, a timing offset, or the like and a method in which all carrier-related information is transmitted using a primary carrier can both be applied according to the present invention. However, the following description will be given focusing on the case where all carrier-related information is transmitted using a primary carrier for ease of explanation.

Figure 10:
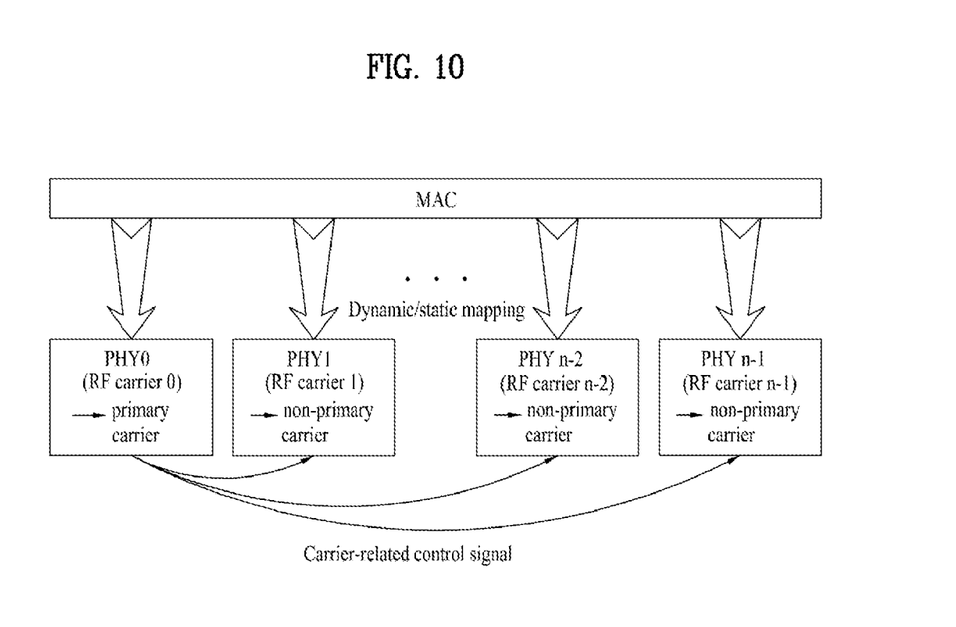
FIG. 10 illustrates the concept that one primary carrier is specified and the primary carrier controls remaining subsidiary carriers.

FIG. 10 illustrates the concept that one primary carrier is specified and the primary carrier controls remaining subsidiary carriers.

Figure 11:
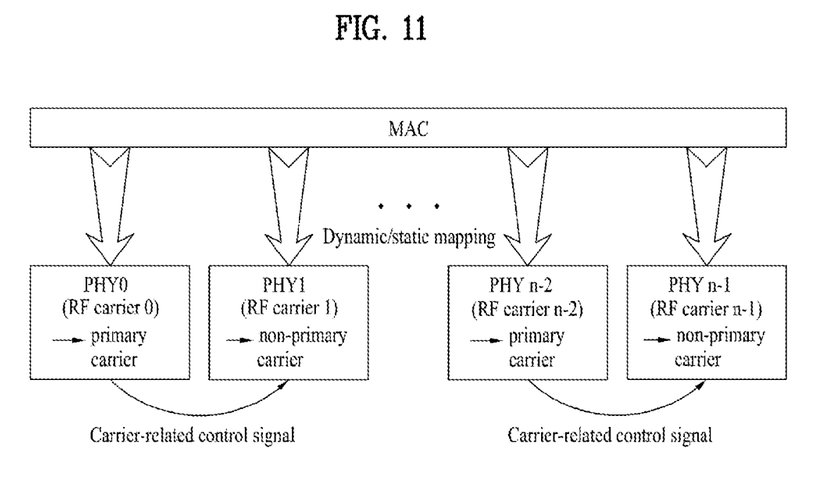
FIG. 11 illustrates the concept that two primary carriers are specified and each of the two primary carriers controls a predetermined number of subsidiary carriers.

FIG. 11 illustrates the concept that two primary carriers are specified and each of the two primary carriers controls a predetermined number of subsidiary carriers.

In the method illustrated in FIG. 10, one primary carrier signals and manages all carrier-related information of the n-1 remaining carriers. On the other hand, in the method illustrated in FIG. 11 according to this embodiment, two primary carriers transmit carrier-related information of two groups of subsidiary carriers, into which all remaining subsidiary carriers are divided, respectively.

When a plurality of primary carriers is specified according to this embodiment as shown in FIG. 11, there is an advantage in that it is possible to support more flexible configurations when a number of terminals are multiplexed. For example, let us assume that one MAC manages 6 carriers, the number of terminals belonging to the MAC is 6, and the 6 terminals are divided into two groups, each including 3 terminals. In this case, it is possible to support terminals corresponding to each group in the following manner.

Figure 12:
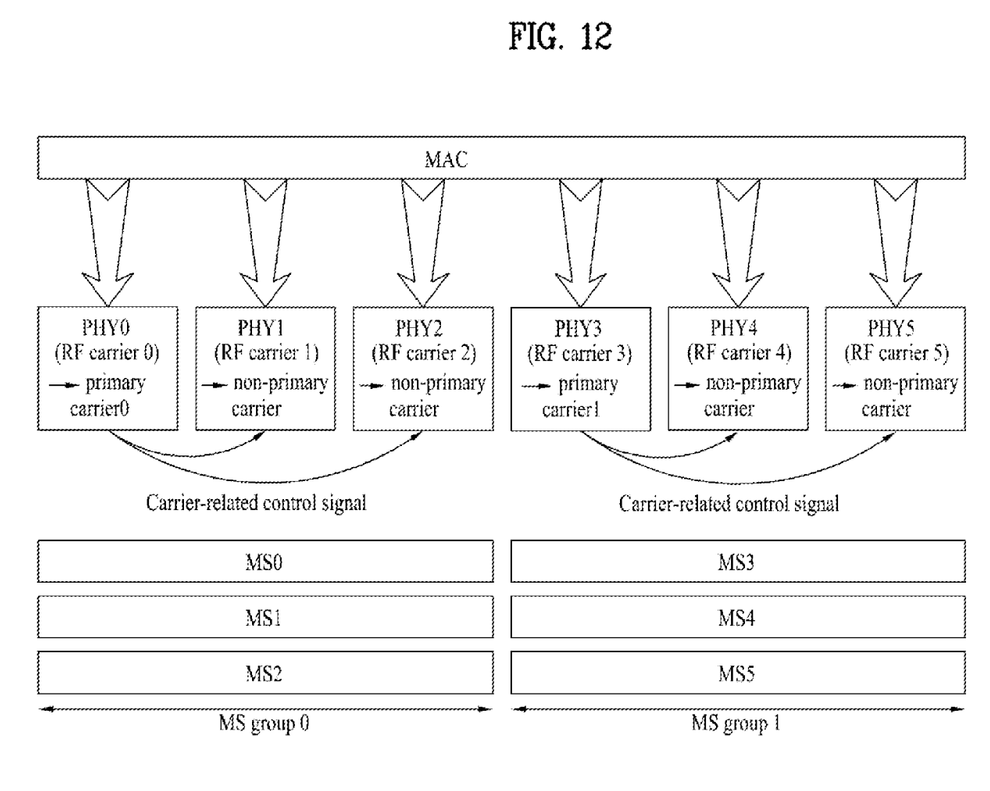
FIG. 12 illustrates a method in which a plurality of primary carriers supports each group including a plurality of terminals according to an embodiment of the present invention.

FIG. 12 illustrates a method in which a plurality of primary carriers supports each group including a plurality of terminals according to an embodiment of the present invention.

In this method, an RF carrier 0 and an RF carrier 3, which are primary carriers, can manage information regarding remaining carriers and 2 groups of terminals (MSs) into which 6 terminals are divided can be allocated respectively to 2 carrier groups managed by the respective primary carriers to provide services.

Although 6 terminals are divided into 2 groups to perform communication in the example of FIG. 12, the terminals may be divided into n groups (other than 2 groups) according to the number of primary carriers to receive services.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The signal transmission/reception method according to each of the above embodiments of the present invention can be widely used for a multi-carrier system in which one MAC entity manages a plurality of carrier frequency bands as described above. That is, the signal transmission/reception method according to each of the above embodiments of the present invention can be applied to any system, regardless of whether it is a 3GPP LTE system or an IEEE 802.16m system, provided that the system is applied as a multi-carrier system as described above.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting, by a base station, signals in a communication system, the method comprising:
    transmitting, to a mobile station via a primary carrier band of the mobile station, carrier aggregation configuration information informing the mobile station of a subsidiary carrier band for the mobile station; and
    receiving, from the mobile station, control information for the subsidiary carrier band via the primary carrier band,
    wherein the carrier aggregation configuration information includes a physical identification of a frequency allocation band used as the subsidiary carrier band and a logical identification assigned to the subsidiary carrier band for the mobile station,
    wherein the physical identification includes one of plural absolute frequency band indexes assigned to frequency allocation bands available in the communication system,
    wherein the logical identification includes a logical index assigned to the subsidiary carrier band identifying the subsidiary carrier band from among a plurality of frequency allocation bands managed by a specific layer above a physical layer, and
    wherein the primary carrier band has a logical index of '0' and the logical index assigned to the subsidiary carrier band is other than '0'.

2. The method of claim 1, wherein the logical index assigned to the subsidiary carrier band is an integer value between '1' and 'a maximum number of frequency allocation bands managed by the specific layer−1'.

3. The method of claim 2, wherein the maximum number of frequency allocation bands managed by the specific layer is less than a total number of frequency allocation bands available in the communication system.

4. The method of claim 1, wherein the specific layer is the medium access control (MAC) layer.

5. The method of claim 1, wherein the control information for the subsidiary carrier band is other than the carrier aggregation configuration information.

6. A method for receiving, by a mobile station, signals in a communication system, the method comprising:
    receiving, by the mobile station via a primary carrier band, carrier aggregation configuration information informing the mobile station of a subsidiary carrier band for the mobile station; and
    transmitting, by the mobile station, control information for the subsidiary carrier band via the primary carrier band,
    wherein the carrier aggregation configuration information includes a physical identification of a frequency allocation band used as the subsidiary carrier band and a logical identification assigned to the subsidiary carrier band for the mobile station,
    wherein the physical identification includes one of plural absolute frequency band indexes assigned to frequency allocation bands available in the communication system,
    wherein the logical identification includes a logical index assigned to the subsidiary carrier band identifying the subsidiary carrier band from among a plurality of frequency allocation bands managed by a specific layer above a physical layer, and
    wherein the primary carrier band has a logical index of '0' and the logical index assigned to the subsidiary carrier band is other than '0'.

7. The method of claim 6, wherein the logical index assigned to the subsidiary carrier band is an integer value between '1' and 'a maximum number of frequency allocation bands managed by the specific layer−1'.

8. The method of claim 7, wherein the maximum number of frequency allocation bands managed by the specific layer is less than a total number of frequency allocation bands available in the communication system.

9. The method of claim 6, wherein the specific layer is a medium access control (MAC) layer.

10. The method of claim 6, wherein the control information for the subsidiary carrier band is other than the carrier aggregation configuration information.

11. A base station for transmitting signals in a communication system, the base station comprising:
a transmitter;
a receiver; and
a processor configured to control the transmitter and the receiver, the processor further configured to:
control the transmitter to transmit, to a mobile station via a primary carrier band of the mobile station, carrier aggregation configuration information informing the mobile station of a subsidiary carrier band for the mobile station; and
control the receiver to receive, from the mobile station, control information for the subsidiary carrier band via the primary carrier band,
wherein the carrier aggregation configuration information includes a physical identification of a frequency allocation band used as the subsidiary carrier band and a logical identification assigned to the subsidiary carrier band for the mobile station,
wherein the physical identification includes one of plural absolute frequency band indexes assigned to frequency allocation bands available in the communication system,
wherein the logical identification includes a logical index assigned to the subsidiary carrier band identifying the subsidiary carrier band from among a plurality of frequency allocation bands managed by a specific layer above a physical layer, and
wherein the primary carrier band has a logical index of '0' and the logical index assigned to the subsidiary carrier band is other than '0'.

12. The base station of claim 11, wherein the logical index assigned to the subsidiary carrier band is an integer value between '1' and 'a maximum number of frequency allocation bands managed by the specific layer−1'.

13. The base station of claim 12, wherein the maximum number of frequency allocation bands managed by the specific layer is less than a total number of frequency allocation bands available in the communication system.

14. The base station of claim 11, wherein the specific layer is the medium access control (MAC) layer.

15. The base station of claim 11, wherein the control information for the subsidiary carrier band is other than the carrier aggregation configuration information.

16. A mobile station for receiving signals in a communication system, the mobile station comprising:
a transmitter;
a receiver; and
a processor configured to control the transmitter and the receiver, the processor further configured to:
control the receiver to receive, via a primary carrier band, carrier aggregation configuration information informing the mobile station of a subsidiary carrier band for the mobile station; and
control the transmitter to transmit control information for the subsidiary carrier band via the primary carrier band,
wherein the carrier aggregation configuration information includes a physical identification of a frequency allocation band used as the subsidiary carrier band and a logical identification assigned to the subsidiary carrier band for the mobile station,
wherein the physical identification includes one of plural absolute frequency band indexes assigned to frequency allocation bands available in the communication system,
wherein the logical identification includes a logical index assigned to the subsidiary carrier band identifying the subsidiary carrier band from among a plurality of frequency allocation bands managed by a specific layer above a physical layer, and
wherein the primary carrier band has a logical index of '0' and the logical index assigned to the subsidiary carrier band is other than '0'.

17. The mobile station of claim 16, wherein the logical index assigned to the subsidiary carrier band is an integer value between '1' and 'a maximum number of frequency allocation bands managed by the specific layer−1'.

18. The mobile station of claim 17, wherein the maximum number of frequency allocation bands managed by the specific layer is less than a total number of frequency allocation bands available in the communication system.

19. The mobile station of claim 16, wherein the specific layer is a medium access control (MAC) layer.

20. The mobile station of claim 16, wherein the control information for the subsidiary carrier band is other than the carrier aggregation configuration information.

* * * * *